United States Patent
Eckardt et al.

(10) Patent No.: US 8,804,896 B2
(45) Date of Patent: *Aug. 12, 2014

(54) METHOD FOR DEPRESSURIZING A NUCLEAR POWER PLANT, DEPRESSURIZATION SYSTEM FOR A NUCLEAR POWER PLANT, AND ASSOCIATED NUCLEAR POWER PLANT

(71) Applicant: Areva NP GmbH, Erlangen (DE)

(72) Inventors: Bernd Eckardt, Bruchkoebel (DE); Norbert Losch, Offenbach (DE); Carsten Pasler, Rodgau (DE)

(73) Assignee: Areva GmbH, Erlangen (DE)

( * ) Notice: Subject to any disclaimer, the term of this patent is extended or adjusted under 35 U.S.C. 154(b) by 80 days.

This patent is subject to a terminal disclaimer.

(21) Appl. No.: 13/775,817

(22) Filed: Feb. 25, 2013

(65) Prior Publication Data

US 2013/0182812 A1   Jul. 18, 2013

Related U.S. Application Data

(63) Continuation of application No. PCT/EP2011/003574, filed on Jul. 18, 2011.

(30) Foreign Application Priority Data

Aug. 25, 2010 (DE) .......................... 10 2010 035 509

(51) Int. Cl.
  *G21C 9/00*   (2006.01)
(52) U.S. Cl.
  USPC .......................................... 376/283; 376/314
(58) Field of Classification Search
  USPC .................................................. 376/283, 314
  See application file for complete search history.

(56) References Cited

U.S. PATENT DOCUMENTS

| | | | | | |
|---|---|---|---|---|---|
| 4,873,050 | A | * | 10/1989 | Eckardt | 376/283 |
| 5,268,939 | A | * | 12/1993 | Tang et al. | 376/210 |
| 5,272,738 | A | | 12/1993 | Schegk | |
| 5,473,647 | A | * | 12/1995 | Eckardt | 376/308 |
| 5,544,669 | A | * | 8/1996 | Manabe et al. | 134/109 |
| 8,218,709 | B2 | | 7/2012 | Eckardt | |
| 2008/0175345 | A1 | * | 7/2008 | Hill et al. | 376/256 |

FOREIGN PATENT DOCUMENTS

DE   3729501 A1   10/1988
DE   38 15 850 A1   11/1989
(Continued)

OTHER PUBLICATIONS

International Search Report of PCT/EP2011/003574.

*Primary Examiner* — Timothy A Brainard
(74) *Attorney, Agent, or Firm* — Laurence A. Greenberg; Werner H. Stemer; Ralph E. Locher

(57) ABSTRACT

A method and a device depressurize a nuclear power plant. A depressurization flow is conducted out of a containment shell into the atmosphere via a depressurization line having a filter system. The filter system contains a filter chamber having an inlet, an outlet, and a sorbent filter. The depressurization flow is first conducted in a high-pressure section, then is depressurized by expansion at a throttle device, then conducted through the filter chamber having the sorbent filter, and finally blown out. To enable an effective retention of activity carriers contained in the depressurization flow, including organic compounds containing iodine, the depressurization flow depressurized by the throttle device is conducted through a superheating section before the depressurization flow enters the filter chamber, in which superheating section the depressurization flow is heated from the not yet depressurized depressurization flow to a temperature that is at least 10° C. above the dew point temperature.

42 Claims, 5 Drawing Sheets

(56) References Cited

FOREIGN PATENT DOCUMENTS

| | | | |
|---|---|---|---|
| DE | 38 25 606 | A1 | 1/1990 |
| DE | 3824606 | A1 | 1/1990 |
| DE | 3901784 | A1 | 7/1990 |
| DE | 103 28 773 | B3 | 2/2005 |
| JP | 6342093 | A | 12/1994 |
| WO | 9016071 | A1 | 12/1990 |

* cited by examiner

METHOD FOR DEPRESSURIZING A NUCLEAR POWER PLANT, DEPRESSURIZATION SYSTEM FOR A NUCLEAR POWER PLANT, AND ASSOCIATED NUCLEAR POWER PLANT

CROSS-REFERENCE TO RELATED APPLICATION

This is a continuation application, under 35 U.S.C. §120, of copending international application No. PCT/EP2011/003574, filed Jul. 18, 2011, which designated the United States; this application also claims the priority, under 35 U.S.C. §119, of German patent application No. DE 10 2010 035 509.7, filed Aug. 25, 2010; the prior applications are herewith incorporated by reference in their entireties.

BACKGROUND OF THE INVENTION

Field of the Invention

The invention relates to a method for depressurizing a nuclear power plant having a containment shell for containing activity carriers and having an outlet for a depressurization flow. The depressurization flow is conducted out of the containment shell into the atmosphere via a depressurization line provided with a filter system. The filter system contains a filter chamber having a filter chamber inlet, a filter chamber outlet and a sorbent filter lying therebetween. The depressurization flow is first conducted in a high-pressure section, then is depressurized by expansion at a throttle device, then is conducted at least partially through the filter chamber having the sorbent filter, and finally is blown out into the atmosphere.

The invention also relates to a corresponding depressurization system for a nuclear power plant having a containment shell for containing activity carriers and having an outlet for a depressurization flow. A depressurization line provided with a filter system is connected to the outlet. The filter system contains a filter chamber having a filter chamber inlet, a filter chamber outlet and a sorbent filter lying therebetween. The depressurization line contains a high-pressure section, at the end of the high-pressure section, a throttle device is connected into the depressurization line. The depressurization line opens out downstream of the throttle device into the filter chamber inlet, and the filter chamber outlet is connected to a blow-out opening leading into the atmosphere.

The invention finally relates to a nuclear power plant having such a depressurization system.

To retain active gases or vapors occurring in accident situations, in particular in the unlikely event of a core meltdown, nuclear power plants are usually surrounded by a comparatively massive containment shell of concrete, reinforced concrete or steel that is hermetically sealed off from the outside world and is also referred to as a containment. Such containment shells are usually also configured to withstand high internal pressures, such as may occur in the case of an oxyhydrogen gas explosion or a major release of coolant vapor from the coolant circuit.

Investigations into the behavior of the containment under significantly increased pressures that occur during accidents have shown, however, that in unfavorable situations it may possibly happen that leakages occurring cause a relevant release of comparatively highly contaminated atmosphere into the surroundings. To minimize such unfiltered leakages, it is very advantageous if extensive depressurization can be carried out down to low excess pressures, or even to ambient pressure. This is of significant importance in particular in the case of containments for which the formation of cracks becomes more likely in such excess-pressure phases as a result of the structural design, such as for example in the case of a concrete containment, or in sensitive sealing regions, such as airlocks, etc.

Therefore, various systems for excess pressure limitation and (filtered) depressurization of the containment in accident situations have already been installed in numerous nuclear power plants. These devices make it possible to retain the aerosols and to some extent also the elemental iodine. Effective retention of organoiodine from this depressurization flow—in passive operation without external energy being supplied—has so far not been possible. Recent findings in accident research show, however, that in such events the emitted organoiodine component in particular can contribute significantly to the radiation exposure of the population, and is consequently a risk factor. Within this application, organoiodine is understood in particular as meaning iodine in the form of organic compounds of a low carbon number, such as methyl iodine, etc.

For example, in the case of the method mentioned at the beginning according to the international patent disclosure WO 90/16071 and the associated apparatus, a depressurization flow under comparatively high pressure and flowing out of the containment shell through a depressurization line is conducted through a filter chamber having a sorbent filter after it has undergone depressurization and expansion drying by a throttle valve that is also referred to as a throttle. Such sorbent filters are also referred to as molecular sieves, or mol sieves for short, and retain the elemental iodine in the depressurization flow by sorption comparatively well if the operating conditions are chosen such that there is no condensing out of the depressurization flow in the molecular sieve. In wet operation, on the other hand, the sensitive filter surfaces may be destroyed or become irreversibly "clogged".

In order to avoid this, according to WO 90/16071, a sufficiently high operating temperature of the iodine sorbent filter, in particular with a silver nitrate coating, is ensured by the comparatively warm depressurization flow in the high-pressure section of the depressurization line, that is to say upstream of the throttle, being conducted past the filter chamber (or else through heating pipes through individual filter elements) and the latter thereby being preheated by way of heat transfer. The device can be combined with a coarse and fine filtering device connected upstream, a metal-fiber screen for dehumidifying gas, and additionally with a freely discharging venturi scrubber. The achieved dew point difference of the depressurization flow in the low-pressure section is substantially determined by the (theoretical) throttle temperature and here is only about 5° C. on account of the structural design. As already mentioned above, according to recent investigations, the retention of organoiodine is not satisfactory, or at least not in economically acceptable operation without the use of external energy.

Furthermore, significant amounts of afterheat occur especially in shutdown phases (no through-flow) because of the decay of the adsorbed activities. This can result in relevant heating of the molecular sieve, wherein the microcrystals are already destroyed at an operating temperature of about 210° C. owing to melting of the silver nitrate coating, and thus the separating effect is lost and activities are released.

The process of pressure reduction in the containment shell by way of (filtered) blowing out of pressurized gas or vapor into the atmosphere is also referred to as venting. Accordingly, the depressurization flow is also referred to as a venting gas flow or similar.

In terms of design and the possible activity emissions, the plants operated nowadays differ significantly from the new third-generation reactors (GEN 3), because in the latter case core meltdown was already taken into account in the design. Devices, such as for example scrubbers or sand-bed filter combinations, that have already been retrofitted do not solve the problem of organoiodine retention, to be regarded as something new, and the desired significant depressurization per se, in particular because of the high driving pressures required in scrubbers and the small reaction surface areas for mass transfer in the liquid phase and the very low separating effect for iodine in sand beds or molecular sieves in wet operation. An improvement of these devices, including in already existing plants, is of essential importance for achieving the higher safety standards of these nuclear power plants.

A quantitative separation of all air-borne aerosol and iodine activities will also permit a significant reduction in costs in GEN3 plants, since the noble-gas activities that cannot be retained decay within a matter of days and thus a medium-term depressurization—without relevant releases—becomes possible. This permits a simplified design of the containment and of the associated safety systems, and consequently significant cost reductions.

SUMMARY OF THE INVENTION

The present invention is therefore based on the object of providing a method for the depressurization of a nuclear power plant of the type mentioned at the beginning that is configured for particularly efficient and effective retention of activity carriers contained in the depressurization flow, in particular iodine-containing organic compounds. It is also intended to provide a depressurization system for a nuclear power plant that is particularly suitable for carrying out the method.

With respect to the method, the object is achieved by providing that, immediately before it enters the filter chamber, the depressurization flow that has been depressurized by the throttle device is conducted through a superheating section, in which it is heated by direct or indirect heat transfer from the not yet depressurized depressurization flow in the high-pressure section to a temperature which is at least 10° C., preferably 20° C. to 50° C., above the dew-point temperature present there.

It has surprisingly been found that the strong activity of a gas flow during the depressurization of a containment can be retained highly effectively by particularly effective passive-regenerative gas superheating downstream of the throttle by heat transfer from the excess-pressure region into the atmospheric region and subsequent sorbent filtering. As stated in more detail further below, the superheating of the depressurized depressurization flow in the low-pressure section may in this case take place on the one hand by direct heat transfer from the high-pressure section of the depressurization line with the venting gas as a heating heat transfer medium (first main variant: "dry" heating). On the other hand, an indirect, multistage heat transfer may take place via a washing liquid circuit of a wet filter/scrubber connected in terms of flow into the high-pressure section, with the washing liquid as an intermediate heating heat transfer medium, which for its part is heated up in the washing tank by the venting gas (second main variant: "liquid" heating). The two variants may also be combined with each other.

The throttle, which is also referred to as a throttle valve or expansion valve, brings about a first drying of the depressurization flow by way of expansion, wherein it is also possible for the temperature to be significantly lower than the theoretical throttle temperature on account of gas humidities that are still contained and non-ideal throttling, depending on the operating phase. In the superheating section connected downstream of the throttle, the decisive superheating of the depressurization flow then takes place—largely independently of the effectiveness of the expansion drying—reliably avoiding condensing out in the region of the moisture-sensitive iodine-sorbent filter even under unfavorable operating conditions.

The effective utilization of the surplus of heat present in the high-pressure region of the depressurization line for preheating the filter chamber on the one hand and for directly heating the depressurized depressurization flow immediately before it enters the filter chamber on the other hand makes it possible to dispense with the use of external energy, for instance in the form of electrical heating devices, in accordance with the principle of regenerative heat recovery with own-medium heating. This makes the method not only highly effective but also particularly energy-efficient.

Advantageously, the depressurization flow is heated in the superheating section to a temperature which is—in the assumed case of design-basis accident events—at least 10° C., preferably 20° C. to 50° C., above the dew-point temperature present there. The dew point or dew-point temperature refers to that temperature at which a state of equilibrium of condensing and evaporating water is established in the depressurization flow, in other words condensate formation is just starting. As has surprisingly been found, the degree of separation for organoiodine, in particular if non-water-soluble silver coatings are used, increases greatly and, if for example such zeolite-based absorption materials are used, typically achieves values of up to 99.99% if the dew point difference is >10° C., preferably >20° C., even in the case of a depressurization flow with a high vapor content that has only been partially cleaned.

Under some circumstances, even minor superheating, of for example 5° C. above the dew point, would suffice for effectively retaining organoiodine with high retention rates for a highly effective molecular sieve with a (water-soluble) silver-nitrate coating. However, it has been found that such a process in the plants known from the prior art depends greatly on largely achieving the theoretical throttling temperature, and on avoiding any residual moisture contents in the gas, which severely minimize superheating. In consideration of these new findings, such a plant of a conventional structural design, as is known for example from international patent disclosure WO 90/16071 mentioned at the beginning, with its immanent minor superheating cannot be operated effectively and safely. Only the concept according to the invention provides an effective remedy for this.

The stated superheating of at least 20° C., particularly preferably at least 50° C., above the dew-point temperature is preferably achieved in the full-load operation of the depressurization system. This should be understood as meaning the initial depressurizing operation after a design-basis accident, when the pressure inside the containment is at a maximum and is typically about 3 to 8 bar, depending on the type of reactor and containment. Here, venting-gas mass flows of typically about 3 to 10 kg/s are reached. The dew-point temperature in the region of the sorbent filter is then typically around 80 to 100° C., depending on the vapor content, with the result that the temperature of the venting gas after superheating has taken place is preferably around 100 to 170° C. when it enters the sorbent filter. In part-load operation, when the venting-gas mass flows are around 25% of the corresponding values in full-load operation, the temperature increase is preferably still at least 10° C.

The iodine sorption filtering can be achieved particularly effectively and compactly here with variable superheating and inverse residence times (short residence time under high superheating and long residence times under lower superheating) to almost atmospheric pressure—without auxiliary energy. Here, in the case of high containment pressure, a high volumetric flow is produced after throttling and, in spite of the resulting low sorption filter residence times, optimum reaction conditions with simultaneously increased diffusion are achieved on account of the now high gas superheating at the sorbent. Under low containment pressure, for example a quarter of the initial maximum pressure of, for example, 5 bar absolute, a low volumetric flow with reduced gas superheating is produced after throttling to almost atmospheric pressure, but effective iodine sorption is likewise made possible in spite of unfavorable sorption conditions on account of the now (around four times) higher sorption filter residence time. Effective sorption filtering is possible as a result, even up to complete depressurization and at containment temperatures of only 50° C. to 100° C., on account of the then still further increasing sorption filter residence time.

In a first main variant of the method, the depressurization flow in the high-pressure section is conducted at least partially past the filter chamber and the chamber is thereby ("dry") heated by almost direct heat transfer from the hot venting gas. That is to say from an apparatus viewpoint that at least a portion of the high-pressure section of the depressurization line is taken past the filter chamber and is thermally coupled to the filter chamber via heat-exchanger surfaces, with the result that the filter chamber is heated by the comparatively hot depressurization flow in the high-pressure section.

In a particularly preferred configuration, the depressurization flow in the high-pressure section is conducted through a washing tank ("scrubber") containing a washing liquid, preferably with inflow nozzles of the venturi scrubber type, before being conducted past the filter chamber. From an apparatus viewpoint, this therefore means that the washing tank is connected into the high-pressure section of the depressurization line upstream of the filter chamber around which the depressurization flow flows. The washing tank brings about effective fine filtering of the aerosols contained in the depressurization flow, preferably with an efficiency of >99%, in order to reduce the aerosol concentration that is typically encountered in the containment shell in the event of an accident of up to several $g/m^3$ to an uncritical range of, for example, a few $mg/m^3$. The effective wet filtering of the aerosols has the effect of avoiding relevant deposits on the downstream heat-exchanger surfaces. This succeeds in ensuring an effective and constantly high heat transfer for the superheating of the depressurization flow depressurized at the throttle and for the heating of the sorbent filter.

The inflow nozzles, through which the depressurization flow enters the washing tank, preferably operate in this case on the venturi injection principle: the gas flow flowing through a constriction (throat) of a nozzle tube entrains washing liquid located in the surrounding washing tank by an inlet opening arranged at the constriction and configured for example in the manner of an annular slit, with the result that particularly intensive mixing between the gas flow and the sucked-in or entrained washing liquid droplets takes place in the manner of an (extremely fine) atomization. Aerosol particles and other particles entrained in the gas flow are thereby adsorbed in the washing liquid droplets. After emerging from the nozzle, the washing liquid and the gas flow separate again, in particular on account of the gravitational force, and the gas flow cleaned and freed of aerosols in such a way leaves the washing tank via a corresponding gas outlet line leading to the downstream heat-exchanger and sorbent-filter unit. The gas outlet line is for this purpose expediently connected to the washing tank above the so-called pool region, that is to say above the operational level of the washing liquid and above the discharge and separation zone.

Alternatively or in addition, customary inflow nozzles directed into or entering the washing liquid may of course also be provided. Furthermore, in the pool region of the washing tank there may be arranged suitable flow internals, vortex generators, mixers, packers and the like, which increase the relevant interface for the (temporary) mixing of the venting gas and the washing liquid or the internal surface between them.

The inflow nozzles and the depressurization line upstream of the inflow nozzles are preferably designed and dimensioned in such a way that the depressurization flow is conducted through the inflow nozzles into the washing tank at a flow rate of over 100 m/s. In the case of high-speed venturi separation, such rates are to be achieved in particular at the constrictions or throats of the venturi tubes, where the inflow openings for the washing liquid are located.

The washing liquid in the washing tank is advantageously chemically conditioned by adding a caustic solution, preferably sodium hydroxide solution, and/or sodium thiosulfate, preferably as an aqueous sodium thiosulfate solution. This brings about a relevant increase in the retention of the activities contained in the venting gas flow, primarily of the elemental iodine. For this purpose, the washing tank is assigned corresponding metering devices and injectors, by which other chemicals can possibly also be added.

Furthermore, a surface-reaction accelerator, in particular in the form of amines, is advantageously admixed with the washing liquid, promoting the adsorption/binding of the aerosols entrained in the venting gas flow in/on the washing liquid.

Further filter elements may be connected into the high-pressure section of the depressurization line between the washing tank and the heat-exchanger/sorbent-filter unit, in particular metal-fiber or cartridge filters acting as fine filters, in order to reduce still further the aerosol content in the depressurization flow before it passes the heat-exchanger surfaces. Such filter elements may also be structurally integrated in the washing tank and are then expediently arranged above the pool region. If such filters are configured for (preferred) dry operation, liquid separators are expediently connected upstream of them to dehumidify the gas flow.

In an alternative variant of the method, the depressurization flow is removed from a condensation chamber of a reactor, in particular of a boiling-water reactor, and conducted from there past the filter chamber and/or the superheating section to heat it, without an (external) washing tank being interposed. That is to say in terms of apparatus that the depressurization line is connected on the inflow side to the condensation chamber.

A condensation chamber is usually understood in this connection as meaning a partial space that is partially filled with liquid (condensate), and separated from the rest of the space inside the containment (known as the pressure chamber) by a gas-tight separating wall and is connected to the rest of the space inside the containment via an overflow pipe entering the liquid and referred to as a condensation pipe. During the normal operation of the nuclear reactor, the overflow pipe is closed by a plug of liquid. In the event of an accident with an appreciable release of vapor and gases that cannot condense and a corresponding buildup of pressure in the pressure chamber, the gas/vapor mixture may enter the condensation chamber via the overflow pipe, the vapor component then condensing for the most part. The components that cannot condense collect above the level of the liquid in the condensation chamber and are removed from there, out of the condensation chamber and the containment shell, according to the variant described here of the invention via the depressurization line as a depressurization flow.

The term "condensation chamber" is intended in this connection also to comprise other condensation pools that act in a similar way, for example condensation channel systems of a water-water energy reactor (WWER) of a Russian or other design.

Since the condensation chamber acts to a certain extent itself as a scrubber and aerosol filter for the depressurization flow, it is therefore possible in a preferred configuration to dispense with a separate washing tank of the type described above arranged outside the containment.

For a good heat transfer, the regenerative heat exchanger, forming the superheating section, and the filter chamber with the sorbent filter are preferably arranged in direct proximity at distances of <5 m, or are favorably integrated within one component. The combination may be arranged here in various chambers within a pressure vessel, in order to minimize heat losses and expenditure and in order to ensure optimum superheating and reaction conditions.

In the aforementioned first main variant of the method, the sorbent filter is preferably arranged in an annular chamber surrounding the central chamber and having already integrated gas heating by way of the heat-exchanger tubes. The annular chamber has for example perforated tube sheet-metal screens with the sorbent. A fiber filter for retention of abraded sorbent particles can be connected downstream of the sorbent filter. Alternatively, a largely pressureless flat filter-chamber construction with interposed regenerative heat-exchanger elements may be provided. In this case, a modular structure is possible by joining together a number of modules. The heating of the sorption unit takes place here immediately before the flow passes through it; the filter chambers are favorably still partially heated externally by a medium.

In a particularly advantageous configuration, the depressurization flow is at least partially conducted through a central chamber, which is surrounded by the filter chamber or adjoins it, the comparatively highly compressed depressurization flow in the high-pressure section being conducted through heat-exchanger elements arranged in the central chamber or protruding into it, in particular heat-exchanger tubes, and the depressurized depressurization flow, of a comparatively large volume, in the superheating section is conducted through the central chamber externally past the heat-exchanger elements. That is to say that the hot depressurization flow, still under high pressure, upstream of the throttle (also possibly only a partial flow of the same) gives off a significant part of its heat to the outside, to the already depressurized depressurization flow conducted around the heat-exchanger tubes, and consequently also indirectly to the even further out filter chamber to preheat the sorbent filter elements.

From an apparatus viewpoint, this means that the filter chamber expediently surrounds or adjoins a central chamber, one or more heat-exchanger elements through which a flow can pass being arranged in the central chamber or protruding into it, and the conduction of the flow in the depressurization line being configured in such a way that the depressurization flow in the high-pressure section is conducted through the heat-exchanger elements and in the superheating section is conducted through the central chamber externally past the heat-exchanger elements. Expediently, one or more through-openings that form the filter chamber inlet are in this case provided between the central chamber and the filter chamber.

For a particularly effective heat transfer, the heat-exchanger elements are preferably in the form of heat-exchanger tubes and are expediently provided on the outside with fins or projections that are arranged at regular intervals, run around them or extend in the longitudinal direction. Corresponding structures or internals may also be provided on the inside of the heat-exchanger tubes to generate turbulence or to form a swirling flow.

The depressurization flow in the superheating section is advantageously conducted in counterflow or cross-counterflow with respect to the depressurization flow in the high-pressure section. From an apparatus viewpoint, this means for example that the heat-exchanger tubes forming the superheating section are arranged in the central chamber or protrude into it with a corresponding alignment, for instance as substantially vertical tubes or tubes bent in a zigzag form.

By configuring the heating surfaces as dirt-repellent, smooth surfaces, with blast-resistant coatings or smooth high-grade steel surfaces, or additionally treated, such as for example polished, electropolished, and integrating condensate distribution systems in the heat exchanger region, such as for example tray or channel systems and/or spray systems, an effective heat transfer is effectively assisted on a sustained basis.

For even more intensive preheating, a partial flow of the high-pressure depressurization flow may be taken from the depressurization line, in particular still upstream of the washing tank, via an additional heat exchanger device (tubes or annular chamber) and, for heating, be conducted directly through the sorbent filter or to a region connected upstream of it. This successfully achieves a further increase in the operating temperatures at the sorbent, in particular in situations with a significantly superheated containment atmosphere, and improves the organoiodine retention still further.

A flow rate of the depressurization flow in the range from 10 m/s to 50 m/s is advantageously set in the high-pressure section. In the superheating section, a flow rate of the depressurization flow in the range from 10 m/s to 70 m/s is preferably set. The free flow cross section of the throttle is expediently set in such a way that the pressure in the high-pressure section is two to five times the pressure in the superheating section. In particular, if there is a (venturi) washing device in the high-pressure section, the wet filtering of the depressurization flow taking place there at a pressure of around 7 to 1 bar is preferably operated at two to five times the molecular sieve pressure at the sorbent filter, which is close to the atmospheric level.

As already mentioned above, the aerosol-containing venting gas in the high-pressure section is advantageously conducted through the heat-exchanger tubes, which are favorably arranged in a channel-like structure (central chamber) to generate high gas rates, in particular of >10 m/s. Heat-exchanger elements (fins) on the raw-gas side are preferably configured with a mutual spacing of >1 mm, particularly preferably >5 mm, and are preferably vertically aligned. By choosing an appropriately over-dimensioned exchange surface on the aerosol-gas side, with an additional heating-surface reserve of >100%, while >500% is particularly robust and operationally reliable (based on the value without fouling), reliable operation can be ensured. Partial filtering of aerosols and iodine can also continue to take place selectively in the heat-exchanger unit.

A configuration as a bare-tube heat exchanger and particularly high flow rates, for example of >10 m/s to 50 m/s, make it possible for the aerosol-containing gases to be conducted through the heat-exchanger tubes, such that relevant deposits in the tubes can be avoided. On the depressurized, atmospheric side, with maximum throughput phases, very high gas rates of >10 m/s to 70 m/s can likewise be set, with the result that high heat transfer values are achieved and very compact components are made possible.

A high-speed regenerative heat recovery can be achieved preferably with a configuration of the heat exchanger according to the counterflow or cross-counterflow principle, as a finned-tube or plate heat exchanger. To achieve an effective heat transfer in cases with a low throughput, corresponding internals or structured tube surfaces (fins etc.) are preferably provided in/on the tubes to generate turbulent and/or swirling flow conditions. This successfully achieves a heat recovery coefficient of >0.5 with very compact units when there is a high containment pressure and high throughput, which can subsequently be increased to 0.8 when there is a low containment pressure and low throughput.

The central chamber of the heat-exchanger/sorbent-filter unit is expediently connected in the bottom region to a condensate-collecting tank for condensate forming during operation. By injecting or charging sodium hydroxide or sodium hydroxide solution (NaOH) and/or sodium thiosulfate ($Na_2S_2O_3$) and/or calcium peroxide ($CaO_2$) into the condensate, for instance in the region of the condensate-collecting tank, or by spraying into the central chamber, a relevant increase in the iodine separation can additionally take place in the low-pressure section of the regenerative heat exchanger. Furthermore, the filtering and/or retention of chlorine-containing gases can be promoted in this way.

In a particularly preferred configuration of the depressurization system, a prefilter (dry prefilter) is provided inside the containment shell, alternatively or additionally also outside the containment shell, for coarse aerosol filtering of the depressurization flow. Advantageously, a bypass line that can be closed by a controllable valve is connected parallel to the prefilter, such that if need be the depressurization flow can be conducted out of the containment shell to the filter systems located outside while partially or completely bypassing the prefilter.

When venting the containment shell, the gas flow with a high activity content can therefore be conducted through the prefilter, where an extensive filtering of the coarse aerosols with diameters of >1 μm (retention rate preferably of >90%) and a partial filtering of the quantitatively low fine aerosol components with diameters of <1 μm (retention rate of preferably >50%) take place for example by metallic deep-bed filter cartridges or metal-fiber filters. The pre-filtering is preferably operated at two to five times the pressure at the sorbent filter (molecular sieve), in the pressure range of for example 7 to 1 bar.

In order to limit the possible pressure losses at the prefilter and, in particular in the presence of a downstream (venturi) washing device at the inflow nozzles, for instance venturi nozzles, in order to allow comparatively high inflow rates to be set, if need be a bypass mode that bypasses the prefilter is provided. The opening of the bypass preferably takes place automatically and passively (that is to say without the use of external energy), by integration of an excess-pressure limiting device, such as for example a bursting disk or a spring-loaded overflow valve device. The opening mechanism may for example be set such that the bypass line is enabled when the pressure loss at the prefilter exceeds a value of >0.5 bar. The retention of the predominant amount of the aerosols from the initial high-concentration phase of the accident that is brought about by the prefilter when the bypass line is closed can then make it possible for the regenerative heat exchanger device to be operated effectively—even without a prefilter—in the later accident phase, with the bypass line open.

Advantageously, the relevant plant components are dimensioned and the operating parameters in depressurization mode are chosen such that the pressure loss brought about by the possibly present prefilter and the regenerative heat exchanger in the high-pressure section is altogether <30% of the available total pressure loss up until release into the atmosphere, in order to ensure a high temperature level for the regenerative heating.

In an advantageous configurational variant, an additional heating device, in particular an electrical heating device or a heating device operated with process steam from another plant, which can expediently be set or controlled independently of the operating conditions in the regenerative heat exchanger and in the superheating section, is provided for heating the depressurization flow in the depressurization line. The heating device may for instance be arranged downstream of the throttle. Alternatively or in addition, such heating elements may also be arranged upstream of the throttle in the high-pressure section of the depressurization line. Advantageous, for example, is an arrangement in the washing tank (if present), for instance in the washing liquid pool or above it, for example in the discharge zone or in the region of possibly present separators/additional filters.

Such additional heating of the depressurization flow may also take place by way of a second heat accumulator that is previously heated up by the depressurization flow or by way of separate auxiliary energy sources. These devices may also be used to bridge the start-up operation.

In a further expedient variant, a gas dryer or a drying cooler is connected into the depressurization line between the throttle device and the superheating section and brings about an additional drying and lowering of the dew point of the depressurization flow before it enters the superheating section. The cooling capacity of such a drying cooler is expediently <25% of the cooling capacity of the regenerative heat exchanger, preferably <10%.

As a result, the dew point is lowered in the interposed cooling device by way of partial condensation and giving off heat to the surroundings or else to masses that are intended to be heated up and have a corresponding heat capacity in operating cases with an already low containment pressure and low temperatures, in other words with only little superheating potential, such as for instance also in the case of start-up. In the subsequent superheating section, a clear dew-point difference can then be ensured by heating up the depressurization flow to almost the high-pressure process temperature.

An (additional) washing device which is configured for retaining chlorine-containing and/or nitrous gases may also be connected into the depressurization line between the throttle device and the sorbent filter, such that the depressurization flow is correspondingly cleaned in the washing device after it is depressurized at the throttle device and before it passes the sorbent filter.

In an advantageous configuration, a suction blower with an electric-motor drive or a combustion-engine drive is connected into the depressurization line, or can be activated if need be, such that, in particular in long-term operation of the depressurization system, i.e. when the initial high internal containment pressure after an accident has already been largely reduced, the depressurization flow is "actively" sucked out from the containment shell by the suction blower through the depressurization line with the filter devices located therein. In other words, by activating a suction blower, the filter system can also remain active in long-term after-accident operation or else be used selectively to keep the containment under pressure, so as to completely avoid unfiltered containment leakages to the outside.

The aforementioned measures, in particular the gas drying and the increase in the dew-point difference brought about as a result, now make it possible to reliably avoid a relevant coating of the large internal reaction surface of the sorbent filter with water-containing vapor, both in the macro-pore region and in the micro-pore region of the sorption means, and consequently to perform the iodine retention particularly effectively by way of adsorption on the surfaces and possibly chemisorption on the sorbent material.

In an advantageous configuration, in particular when there is wet filtering in the high-pressure section by a corresponding washing device, the bypass line is connected into the depressurization line to bypass the filter chamber. In this case, the proportion of the depressurization flow that flows through the bypass line can expediently be set by suitable adjusting device. This makes possible an operating mode of the depressurization system in which a partial flow (that can be set) of the depressurization flow is blown out directly into the atmosphere via the bypass line while bypassing the filter chamber and the iodine sorption filter arranged therein. For pressure adaptation, a suitable pressure-reducing valve is expediently connected into the bypass line.

This allows an effective retention of the activities as a whole, without having to make excessive use of the iodine absorption filter, when there are very high throughputs, for example in early phases of an accident with large amounts of gas and little occurrence of organoiodine, and the elemental iodine that is dominant in this phase largely being separated in the upstream scrubber device. In later phases—with relevant organoiodine formation that has in the meantime commenced, and thus a comparatively lower occurrence of gas—the full-flow filtering with inclusion of the iodine sorption filter then advantageously takes place with the bypass line largely or completely closed, in order to continue to ensure the high level of retention of the activities as a whole.

The sorbent materials or sorption agents are preferably configured with >50 $m^2/g$ of internal surface and are made of inorganic materials. The then permanently acting superheating process consequently even makes it possible to use sorbent materials with a moisture-sensitive (water-soluble) silver-nitrate coating or doping.

For example, use of silver-impregnated ceramic products, for example silica gel, makes it possible to achieve a very efficient iodine separation of >99.9% on a sustained basis. The molecular sieve may for example also be produced on a zeolite basis or with a different, preferably inorganic, carrier body and be coated or doped with silver nitrate ($AgNO_3$), which is converted for example into silver iodide when iodine occurs. However, this is only favorable if sufficient superheating of the depressurization flow can be ensured in all operating phases. Advantageously, the organoiodine retention can be performed here highly effectively even in contaminated gases, for example gases containing nitrogen oxide and the like.

An artificial zeolite, into which silver cations and/or heavy-metal cations have been introduced into the three-dimensional crystal lattice, for example by ion exchange, may be used as a more robust filter material. Combinations of binder-free zeolites, preferably with an open structure, are also possible. Such a binder-free molecular sieve, for example of the faujasite-structure type, is even better in terms of operational reliability, even in a highly superheated vapor atmosphere of for example >200° C., and also under short-term water-vapor sorption conditions (wet operation). Short-term wet operation therefore does not lead to destruction of these, for example silver-doped, zeolites. Similarly, a small introduction of caustic solution can be tolerated. Furthermore, an (additional) short-term gas superheating is achieved by way of moisture adsorption.

It is particularly preferred if the sorbent filter contains a zeolite-based sorbent material as a mixture of zeolites with non-water-soluble doping, in particular a silver doping, and inorganic sorbent materials with water-soluble doping, for instance a silver-nitrate doping. In this case, the water-vapor adsorption advantageously takes place exclusively, or at least primarily, on the zeolite, even in short wet phases, the temporarily occurring release of adsorption heat being conducive to the process, with the result that elution of the water-soluble substances, such as for instance silver nitrate, can then be reliably avoided. This combination as a mixture of for example both zeolites with a silver doping and a molecular sieve with a silver-nitrate doping and/or also being accommodated on a common carrier body proves to be highly efficient and operationally reliable as a result of the dual separating mechanism.

Furthermore, phosphazene molecules, phosphazene zeolites, in particular cyclo-triphosphazene zeolites, channel-type crystals, possibly with additional doping, may also be used as suitable sorbent materials for particularly effective and economical iodine retention.

In a preferred configuration, the filter chamber may also contain in addition to the iodine sorbent filter further filter devices and retention devices, for instance for retaining chlorine-containing and/or nitrous gases and/or oil-containing compounds. For this purpose, sand-bed filters may be provided for example, and possibly the injection or charging of suitable chemicals.

In addition, further short-term gas superheating can be achieved here in certain operating phases by specific partial adsorption of water vapor on the aforementioned zeolites (increase of the moisture by for example <2 percent by weight through sorption), and in this way the desired continuous organoiodine retention can be ensured. This is of interest in particular in start-up operation (known as start-up adsorption). To limit the temperatures in the occurrence of moisture, furthermore, a selective limitation of the catalytic activity of these sorption agents, for example by way of diffusion layers or mixed doping (for instance with silver cations and/or heavy-metal cations) and possibly with non-catalytic additives, can also be performed.

As already indicated further above, during start-up operation of the depressurization system—at operating temperatures which are still comparatively low—at least partial vapor adsorption is advantageously permitted in the sorbent filter and the adsorption heat is used for superheating the depressurization flow and the sorbent filter. However, this is only meaningful if the sorbent filter is sufficiently insensitive to moisture, that is to say for example is configured on a zeolite basis with non-soluble doping.

In a second main variant of the method, which is based on the presence of a washing tank for the wet filtering of the depressurization flow in the high-pressure section, the washing liquid is conducted out from the washing tank through a circulation line, at least a portion of which is in thermal contact with the filter chamber and heats the latter by heat transfer from the circulating washing liquid. That is to say from an apparatus viewpoint that a circulation line for the circulation of washing liquid is connected to the washing tank, the circulation line being taken past the filter chamber and being in thermal contact with it, with the result that a heat transfer takes place from the circulating washing liquid to the filter chamber.

This therefore means that the amount of heat entrained by the venting gas flow in the high-pressure section of the depressurization line is in large part transferred in the washing tank to the washing liquid, which then circulates through the filter chamber or past it, whereby a renewed heat transfer takes place for the heating of the filter chamber with the sorbent filter and/or for the superheating of the depressurization flow depressurized by the throttle immediately before it enters the sorbent filter.

It is particularly preferred if the depressurization flow depressurized by the throttle in the superheating section is in thermal contact with the circulation line and is heated by heat transfer from the circulating washing liquid. For this purpose, the superheating section of the depressurization line is thermally coupled to the circulation line via heat-exchanger surfaces, with the result that a heat transfer takes place there from the circulating washing liquid to the depressurization flow.

In a preferred configuration, the flow of the washing liquid through the circulation line is driven by the impulse transferred from the depressurization flow to the washing liquid in the washing tank. For this purpose, at least one of the inflow nozzles is aligned in a suitable way, for instance directed toward the inlet of the circulation line, such that the impulse of the depressurization flow flowing through it that is transferred to the washing liquid drives the circulation of the washing liquid through the circulation line. Alternatively or in addition, however, corresponding motor-driven pumps may also be provided, in order to drive or assist the circulation flow.

Advantageously, the circulation line has a washing liquid inlet, opening into the washing tank, and a washing liquid outlet, lying higher in relation to the washing liquid inlet and likewise opening into the washing tank. In this way, after flowing through the circulation line, the washing liquid removed from the washing tank is returned to the washing tank at a geodetically higher point.

The washing liquid is preferably removed from the washing tank at a point at which the content of gas bubbles in the depressurization flow is particularly high, that is to say for example in the discharge region of the inflow nozzles.

In a preferred configuration, a central chamber which surrounds or adjoins the filter chamber is provided, the circulating washing liquid being conducted through heat-exchanger elements arranged in the central chamber or protruding into it, in particular heat-exchanger tubes, and the depressurization flow in the superheating section being conducted through the central chamber externally past the heat-exchanger elements. The washing liquid flowing through the heat-exchanger tubes therefore gives off a large part of its heat content to the low-pressure depressurization flow flowing externally past the tubes, which is thereby superheated before it enters the filter chamber. In addition, before it enters the filter chamber, the low-pressure depressurization flow superheated in this way gives off a smaller part of its heat content to the further out filter chamber, which is thereby preheated to a certain extent.

Furthermore, it is favorable if the low-pressure depressurization flow in the central chamber is conducted in counterflow or cross-counterflow with respect to the washing liquid flowing through the heat-exchanger elements.

Furthermore, it is advantageously provided that the depressurization flow flows through the central chamber with a vertical main direction of flow from top to bottom and the washing liquid flows through the heat-exchanger elements with a vertical main direction of flow from bottom to top.

A flow rate of the washing liquid in the circulation line of over 1 m/s, preferably of over 3 m/s, is preferably set, such that deposits from the washing liquid can be largely avoided and a particularly effective heat transfer is accomplished.

In other words: the washing liquid serving as a heat transfer medium is driven by the impulse of the high-speed introduction of venting gas. The washing liquid is thereby removed from the washing tank close to where the venting gas is introduced and is transported through pipes into the heat exchanger of the heat-exchanger/sorbent-filter unit and subsequently back again into the pool of the washing tank. Specifically by selective removal of a liquid mixture containing more venting gas (containing bubbles) and conducting it in a rising manner through the heat exchanger device, the drive is further intensified on account of the lower density in comparison with the density of the (bubble-free) washing liquid in the pool of the washing tank, in particular if it is reintroduced at a geodetically higher point. The removal in the hottest zone of the scrubber, with a content of air and vapor bubbles, and the condensation of vapor bubbles during the heat transfer allow the temperature level to be increased further and the temperature difference in the heat exchange to be minimized further. The return into the washing tank preferably takes place above the sedimentation zone.

It should also be noted that the statements made above in connection with the first main variant of the method/the device with regard to the filter materials and the temperature conditions at the sorbent filter, with regard to the pressure conditions and the flow rates in the lines carrying venting gas, with regard to the configuration of the washing tank and the inflow nozzles arranged therein, and with regard to the optionally provided components containing the gas dryer, blower, additional filter, etc., also readily apply to the second main variant, and therefore do not have to be repeated in detail at this point.

The first and second main variants of the method and of the associated depressurization device may also be combined with one another, to be precise in particular in the sense that a heating of the filter chamber with the sorbent filter and/or of the depressurized depressurization flow in the superheating section is possible both directly by way of the depressurization flow in the high-pressure section ("dry") and indirectly by way of the washing liquid ("liquid/wet"). For example, the structural design may be such that, at least in certain operating situations, heating takes place simultaneously in both ways (i.e. both "dry" and "liquid"), but in other operating situations, such as depending on the filling level of the washing liquid in the washing tank, only takes place in one of the two ways. In a further development of the concept, means for actively and deliberately switching over from one mode to the other are provided.

Specifically in the case of the aforementioned combination of various heating concepts, but also in other cases, the washing tank and the heat-exchanger/sorbent-filter unit, possibly also only parts of the same, for instance the heat exchanger, may be structurally united or integrated in a common component. An example of this is explained in the detailed description of the figures.

It is accordingly provided according to the invention that the depressurization line has between the throttle device and the filter chamber inlet a superheating section, which is thermally coupled to the high-pressure section via heat-exchanger surfaces, these heat-exchanger surfaces being dimensioned in such a way that the depressurization flow established under design-basis accident conditions in the superheating section is heated to a temperature which is at least 10° C., preferably 20° C. to 50° C., above the dew-point temperature present there.

Further advantageous configurations of the device have already been described further above or follow analogously from the description of the corresponding method steps.

The advantages achieved by the invention consist in particular in that a relevant coating of the reaction surfaces with water vapor and blocking by way of capillary condensation are reliably prevented by way of a selective superheating of the depressurization flow before it enters the iodine sorbent filter in the sorbent both in the macro-pore region and in the micro-pore region. The passive-regenerative configuration of the superheating process with heat recovery from the high-pressure region allows the method also to be used when there is a complete energy failure ("station blackout") in the nuclear power plant to be depressurized. Furthermore, the decidedly high gas superheating of >10° C., preferably >20° C., for example in the temperature level from >120° C. to 170° C. and more (when there are high throughput rates and high gas superheating in the initial phase of the depressurization process), brings about a significant increase in the reaction rates in the iodine sorption filter. The then almost unlimitedly available, very great internal reaction surfaces and the improved diffusion succeed in achieving a passive, highly effective iodine sorption filtering, including for organoiodine compounds, with retention rates of >97%, preferably >99%. A resuspension (re-release) of the iodine from the iodine sorbent filter can be largely avoided by the chemical binding of the iodine and by the permanent heating of the iodine sorbent filter.

The highly effective wet filtering of the depressurization flow in the high-pressure region, possibly in conjunction with further filter devices, in particular a metallic prefilter and/or a dry filter on a sand-bed or gravel-bed basis, consequently makes it possible for the first time for the active gases or vapors occurring in the containment in accident situations to be discharged to the surroundings after being filtered with an organoiodine retention of >99% to 99.9%—for ultimate pressure limitation in the containment. In this case, other air-borne activities and aerosols are also reliably retained in the filter system, even when venting operation continues over several days.

Other features which are considered as characteristic for the invention are set forth in the appended claims.

Although the invention is illustrated and described herein as embodied in a method for depressurizing a nuclear power plant, depressurization system for a nuclear power plant, and associated nuclear power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts that are the same or have the same effect are provided with the same designations in all the figures.

Figure 1:
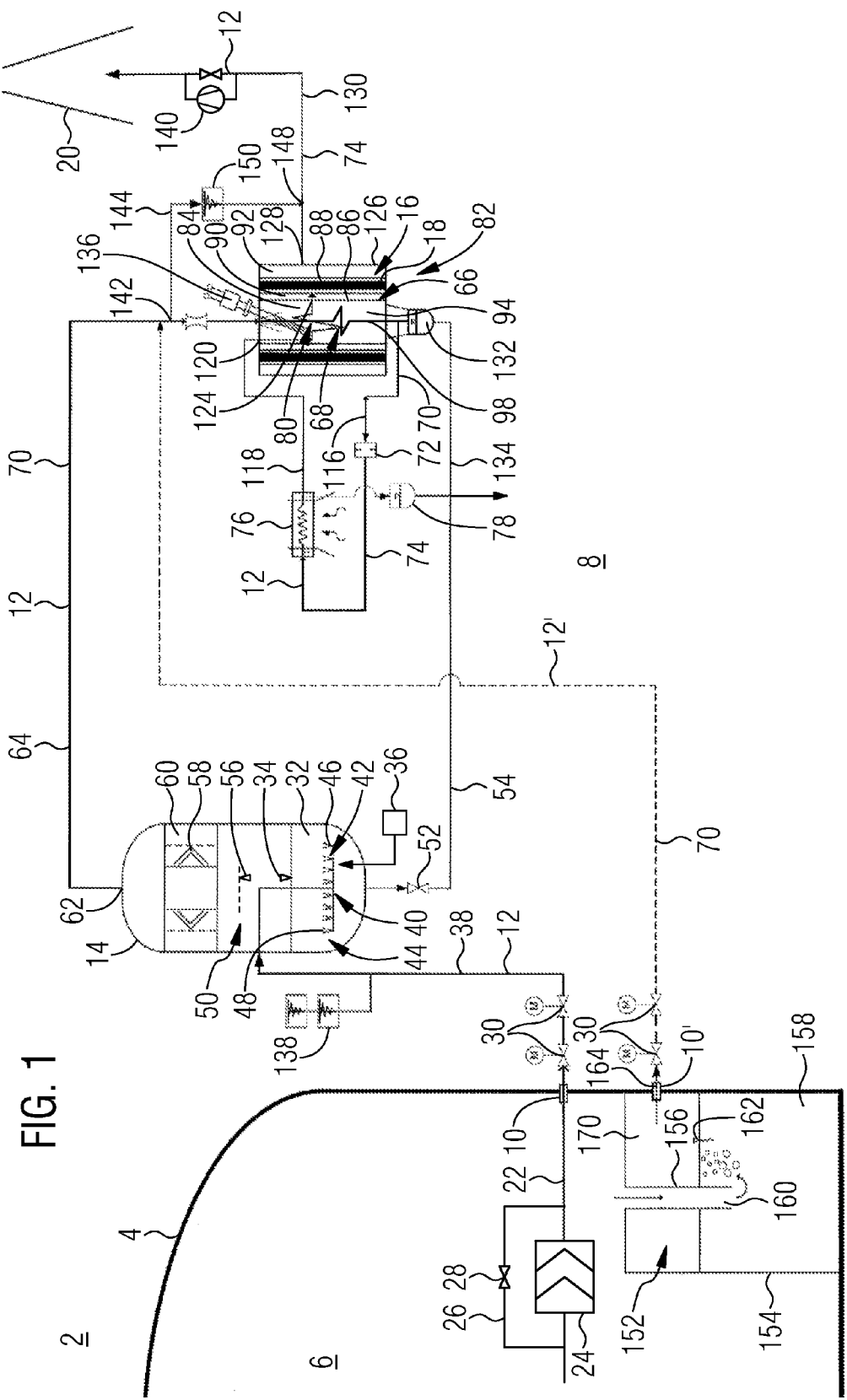
FIG. 1 is a schematic diagram of components of a depressurization system according to the invention for a nuclear power plant.

Referring now to the figures of the drawing in detail and first, particularly, to FIG. 1 thereof, there is shown a nuclear power plant 2 represented in the form of a detail has an outer containment shell 4, which is also referred to as a containment and has a massive reinforced-concrete shell. The containment shell 4 encloses an interior space 6. Arranged in the interior space 6 are the major nuclear components of the nuclear power plant 2, such as for instance the reactor pressure vessel with the reactor core and also further nuclear and non-nuclear plant components (not represented). The reinforced-concrete shell of the containment shell 4 is lined on its inside with a steel casing. The containment shell 4 forms a hermetic seal for the interior space 6 from the outside world and, in the unlikely event of an accident involving the release of radioactively charged gases or vapors, has the effect of retaining and containing them in the interior space 6.

The containment shell 4 is configured for withstanding even comparatively high internal pressures of for example 3 to 8 bar in the interior space 6, as could occur for instance in accident situations involving a massive release of vapor, and at the same time remaining sealed over a relatively long period of time. At the same time, to increase the reactor safety further, and also to make the interior space 6 accessible again after an accident, a depressurization system 8 is provided, with the aid of which the gases and vapors contained in the interior space 6 can be blown out into the surroundings after being filtered and cleaned, and to the greatest extent free of any activity, with the result that a controlled reduction of pressure in the interior space 6 is made possible. The corresponding process is also referred to as venting.

The depressurization system 8 is configured in the present case for particularly effective and low-energy retention of activity carriers contained in the venting gas, in particular of elemental iodine and iodine-containing organic compounds of a low carbon number (known as organoiodine). For this purpose, the depressurization system 8 contains a depressurization line 12, which is connected to an outlet 10, or to a penetration through the containment shell 4, and connected into which there are one behind the other, inter alia, a washing tank 14 and, further downstream, a sorbent filter 18, arranged in a filter chamber 16, to be specific an iodine sorbent filter. Further downstream, the filtered depressurization flow is blown out into the surrounding atmosphere via a flue 20 or chimney, generally a blow-out opening. The direction of flow of the depressurization flow is respectively indicated by arrows.

As can be seen in FIG. 1, the depressurization line 12 may also contain an inner line section 22, which lies inside the containment shell 4 and into which there is optionally connected a prefilter 24, in particular a metal prefilter, for retaining the coarse aerosols. For bypassing the prefilter 24 if need be, a bypass line 26 connected parallel to it is provided and can be opened or closed as and when required by a control valve 28.

One or more shut-off valves 30, which are connected into the depressurization line 12 and are closed during the normal operation of the nuclear power plant 2, may be arranged outside the containment shell 4, as can be seen in FIG. 1, alternatively or in addition also inside the containment shell 4. In order to initiate the depressurizing process in the event of an accident involving an increase in pressure in the interior space 6, the respective shut-off valve 30 is opened, which preferably takes place automatically and without the use of external energy, for instance by way of a pressure-dependent triggering device.

For setting operating conditions that are as optimum as possible with regard to the filtering objective on the sorbent filter 18, a series of technical measures are provided.

On the one hand, the depressurization flow (venting gas flow) coming from the interior space 6 of the containment shell 4 and under comparatively high pressure is conducted through a washing liquid 32 in the washing tank 14 and thereby cleaned, in particular freed of coarse aerosols.

For this purpose, in the standby state of the depressurization system 8, the washing liquid 32 is kept in the washing tank 14 at a minimum filling level 34. For the chemical conditioning of the washing liquid 32, in particular for improving the filtering and retaining properties, suitable reagents, for example sodium thiosulfate solution, may be fed into the washing liquid 32 via a metering device 36 that is only schematically indicated here.

In venting operation, that is to say in the case of depressurization, the depressurization flow is conducted via the line section 38 of the depressurization line 12 into the washing tank 14 and leaves via a manifold 40, and subsequently a plurality of inflow nozzles 42 connected in parallel in terms of flow. The inflow nozzles 42 are located below the minimum filling level 34 in what is known as the washing liquid pool 44, pool for short, of the washing tank 14 and are configured here as venturi nozzles. For this purpose, the respective inflow nozzle 42 has a partly narrowing venturi tube 46, an annular-slit feed (not represented) for the surrounding washing liquid 32 being provided at the construction, which is also referred to as a throat. The depressurization flow flowing through the venturi tube 46 during venting operation consequently entrains washing liquid 32 entering at the throat. Therefore, an intimately swirled-together washing-liquid/venting-gas mixture is discharged from the upwardly directed outlet openings 48 of the inflow nozzles 42, the contaminants and aerosols contained in the venting gas flow largely being adsorbed in the washing liquid 32.

In the discharge zone 50 located above the washing liquid pool 44, the liquid and gaseous components of the washing-liquid/venting-gas mixture are separated again by gravitational force. The washing liquid 32, possibly augmented with condensate from the venting gas flow and enriched with aerosols and contaminants (particles, soluble gases) sinks back down into the washing liquid pool 44. Excess washing liquid 32 or condensate is carried away if need be via a liquid-discharge line 54, which is connected to the bottom of the washing tank 14 and is provided with a shut-off valve 52, with the result that the liquid level in the washing tank 14 does not exceed a predetermined maximum filling level 56. Once it has passed through moisture separators 58 and possibly further filter elements 60 arranged above the discharge zone 50 and above the maximum filling level 56, the venting gas cleaned by the washing process and still under high pressure leaves the washing tank 14 upwardly via the outlet opening 62 and enters the downstream line section 64 of the depressurization line 12.

On the other hand, during depressurizing operation, the filter chamber 16 with the sorbent filter 18 is itself preheated via associated heat-exchanger surfaces 66, 68, by the depressurization flow coming from the line section 64, which has previously been cleaned in the washing tank 14, is still approximately (at least in terms of the order of magnitude) at the level of the pressure in the interior space 6 of the containment shell 4 and is comparatively hot. Only after the heat dissipation and transfer in the high-pressure section 70 of the depressurization line 12 is the depressurization flow depressurized in a further downstream throttle valve, throttle 72 for short, to approximately (at least in terms of the order of magnitude) ambient pressure and thereby dried. The part of the depressurization line 12 that is upstream of the throttle 72 forms the high-pressure section 70, the part that is downstream forms the low-pressure section 74.

Following the expansion drying by way of the throttle 72, the depressurization flow is conducted through an (optional) additional gas dryer 76 with an associated condensate separator and condensate-collecting tank 78. Further downstream, the depressurization flow in the low-pressure section 74 of the depressurization line 12 is conducted past the high-pressure section 70 in such a way that heat transfer from the gas flow in the high-pressure section 70 to the gas flow in the low-pressure section 74 takes place on corresponding heat-exchanger surfaces 68 of a superheating section 80. Only after the superheating brought about as a result is the depressurized depressurization flow conducted through the filter chamber 16 with the sorbent filter 18.

The thermal energy contained in the not yet depressurized depressurization flow in the high-pressure section 70 is therefore used in two ways: on the one hand, a heating of the filter chamber 16 with the sorbent filter 18 contained therein takes place via the heat exchanger surfaces 66, 68. On the other hand, a superheating of the depressurized depressurization flow takes place via the heat-exchanger surfaces 68 immediately before it enters the filter chamber 16. In this case it is ensured by suitable dimensioning and design of the flow-carrying and heat-conducting components, and possibly by suitable setting of the throttling cross section of the throttle 72 and further operating parameters, that the depressurization flow in the superheating section 80, that is to say immediately before entry into the filter chamber 16, is heated to a temperature which lies at least 10° C. above the dew-point temperature present there, in the full-load operation of the depressurization system 8 even at least 20° C. above it. The combination of these two measures reliably avoids condensation of the depressurization flow in the filter chamber 16, which could lead to an impairment of the efficiency or even to permanent destruction of the sorbent filter 18.

Figure 2:
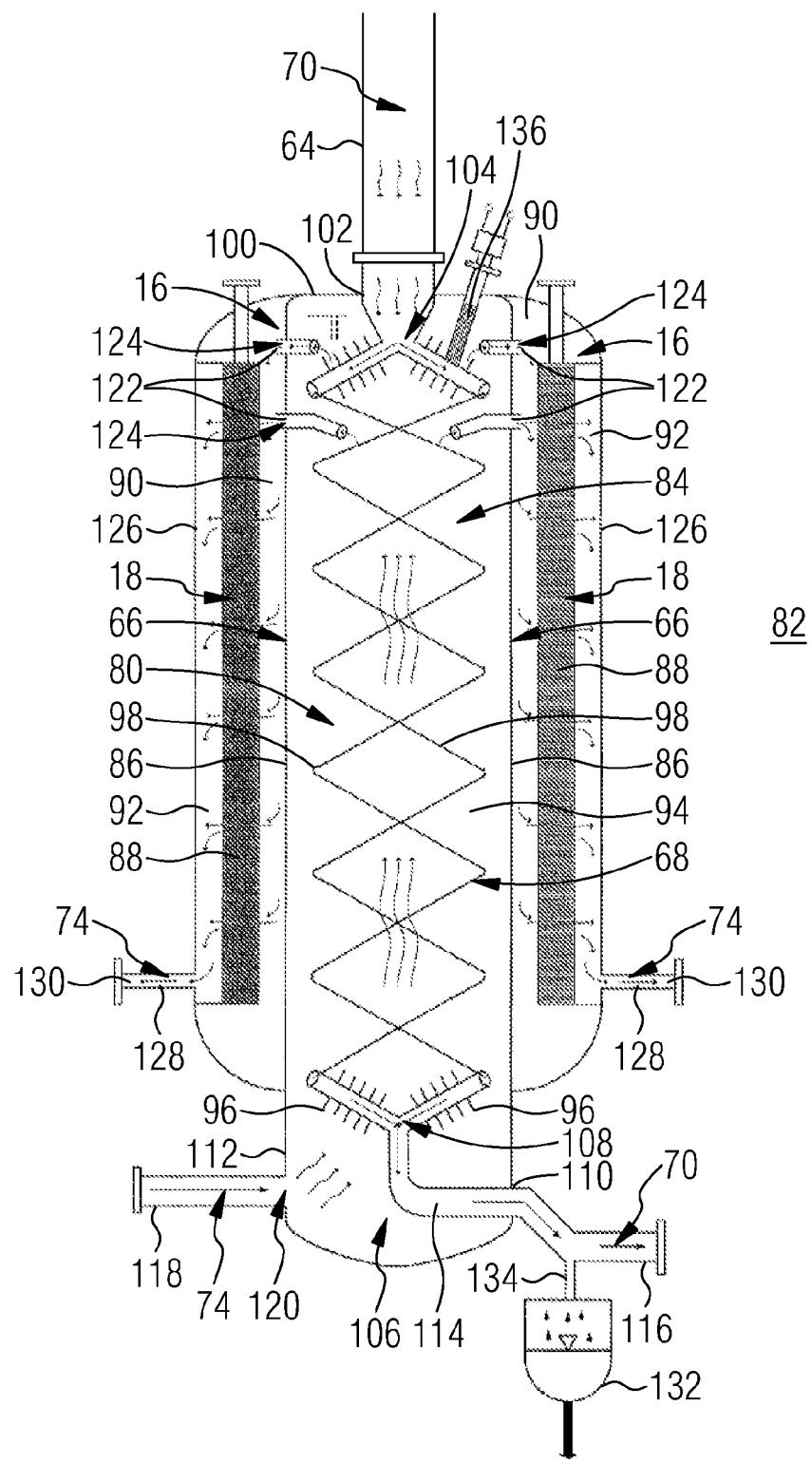
FIG. 2 is a longitudinal sectional view of a combined regenerative heat-exchanger and sorbent-filter unit of the depressurization system according to FIG. 1.

FIG. 2 shows in somewhat more detail an actual configuration of the heat-exchanger/sorbent-filter unit 82 containing the heat-exchanger surfaces 66 and 68. The filter chamber 16 is configured as an annular chamber, which surrounds the, for example cylindrical or cuboidal, central chamber 84 in an annular and, in particular, coaxial manner. The longitudinal axis of the heat-exchanger/sorbent-filter unit 82 is vertically aligned. The filter chamber 16 and the central chamber 84 are separated from each other—at least in a lower region—in a gas-tight manner by a highly heat-conducting separating wall 86. The filter chamber 16 is for its part divided by filter elements 88 arranged in it in an annular manner into an inner inflow space 90, inwardly bounded by the separating wall 86, and an outer outflow space 92. As an alternative to the annular chamber type of construction, a plain box type of construction may also be provided, a cuboidal central chamber 84 being adjoined for example on one side by a cuboidal filter chamber 16 separated by a straight separating wall 86. Of course it is also possible for a central chamber 84 to be assigned a number of filter chambers 16, which are separate from one another and are then connected in parallel in terms of flow with respect to the depressurized depressurization flow in the low-pressure section 74.

The line section 64 of the depressurization line 12 leading away from the washing tank 14, as seen in the direction of flow of the depressurization flow, is connected to a system of heat-exchanger tubes 98 connected in parallel in terms of flow and provided with fins 96 on their outside, and possibly also on their inside, arranged in the interior space 94 of the central chamber 84 (the heat-exchanger tubes 98 are drawn in half-perspective in the end regions, in between are only represented as simple lines). For this purpose, at the end of the line section 64, the depressurization line 12 is taken through a housing aperture 102, which is arranged in the cover housing 100 of the central chamber 84 and closed in a gas-tight manner on its outside, into the central chamber 84 and connected to the heat-exchanger tubes 98, possibly via a branching piece 104. Alternatively, plate heat exchangers or other heat-exchanger elements may also be provided. The heat-exchanger tubes 98 are led in a meandering manner from top to bottom in the interior space 94 of the central chamber 84, into the bottom region 106, where they come together again in a header 108. Connected to the header 108 downstream is a pipeline 114, which is taken through a further housing aperture 110 of the central chamber housing 112 and opens out into the line section 116 of the depressurization line 12 that leads to the throttle 72.

The line section 118 of the depressurization line 12 that leads away from the throttle 72 returns into the central chamber 84 after the optionally provided gas dryer 76. The central chamber 84 therefore has in the bottom region 106 a central chamber inlet 120, to which the line section 118 coming from the throttle 72 or from the gas dryer 76 is connected (also see FIG. 1). Provided at the upper end of the central chamber 84, in the vicinity of the cover housing 100, are a plurality of through-openings 122, which penetrate the separating wall 86, lead from the interior space 94 of the central chamber 84 into the inflow space 90 of the filter chamber 16 and consequently together form the filter chamber inlet 124. The outflow space 92 of the filter chamber 16 is connected to the line section 130 of the depressurization line 12 that leads to the flue 20 via the filter chamber outlet 128, which is arranged downstream of the filter elements 88 on the outside of the filter chamber housing 126, for example in the bottom region thereof or else at another point (in FIG. 2, two outlet openings connected in parallel in terms of flow along with associated line connections are provided, and may be brought together again further downstream in a way that is not represented).

In this way, the depressurization flow in the line section 64, coming from the washing tank 14, is under high pressure and is comparatively hot, is conducted via the housing aperture 102 into the central chamber 84 and flows through the heat-exchanger tubes 98 arranged therein with a main direction of flow pointing substantially vertically from top to bottom. Subsequently, the venting gas is conducted via the line section 116 to the throttle 72, dried by expansion and then conducted through the gas dryer 76. The depressurized gas flow enters the central chamber 84 again via the line section 118. It is conducted in counterflow or cross-counterflow with respect to the high-pressure depressurization flow in the heat-exchanger tubes 94 substantially from bottom to top past the heat-exchanger tubes 98, to pass finally via the through-openings 122 of the filter chamber inlet 124 into the filter chamber 16, where the desired organoiodine filtering and retention take place.

When it flows through the heat-exchanger tubes 98, a heat transfer takes place from the hot high-pressure depressurization flow in the heat-exchanger tubes 98 to the surrounding low-pressure depressurization flow that is conducted in counterflow past the heat-exchanger tubes 98, depressurized by the throttle 72 and dried. The tube walls of the heat-exchanger tubes 98 thereby form the heat-exchanger surfaces 68 of the superheating section 80 formed by the interior space 94 of the central chamber 84, in which the superheating already described above of the depressurized depressurization flow takes place before it enters the inflow space 90 of the filter chamber 16 in the superheated state via the filter chamber inlet 124 formed by the through-openings 122, subsequently flows through the filter elements 88 and finally reaches the flue 20 in a filtered state via the outflow space 92, the filter chamber outlet 128 and the line section 130. At the same time, a heat transfer takes place—usually to a lesser extent—via the highly heat-conducting separating walls 86 that effectively act as heat-exchanger surfaces 66, from the low-pressure depressurization flow heated up in this way to the filter chamber 16, which as a result is likewise correspondingly heated.

To improve the heat transfer, the heat-exchanger tubes 98 may also be suitably structured in their interior, for example provided with fins or have other internal fittings that generate turbulence or a swirling flow.

The depressurization system 8 according to FIG. 1 is also configured for the purpose that, if need be, a partial flow of the depressurization flow in the high-pressure section 70 can be conducted past the heat-exchanger/sorbent-filter unit 82, that is to say does not flow through the heat-exchanger tubes 98, the throttle 72, the central chamber 84 and the filter chamber 16. This bypass partial flow consequently does not contribute to the superheating of the low-pressure depressurization flow in the superheating section 80 and to the heating of the filter chamber 16. For this purpose, at the branching point 142 downstream of the washing tank 14 and upstream of the heat-exchanger tubes 98, a bypass line 144 is connected to the line section 64 of the depressurization line 12, and opens out again into the depressurization line 12, to be specific into the line section 130, at the opening point 148 downstream of the filter chamber outlet 128. For setting the conditions of the partial flow, suitable adjusting and controlling devices (not represented) may be provided. Furthermore, a pressure-reducing valve 150 may be connected into the bypass line 144 for adapting the pressure level.

Condensate 132 forming as the flow passes through the heat-exchanger tubes 98 may be removed if need be by way of a condensate-discharge line 134 branching off from the pipeline 114 of the line section 116, and be conducted for example to a condensate-storage tank. As represented in FIG. 1, the condensate-discharge line 134 may be brought together with the liquid-discharge line 54 from the washing tank 14.

The filter elements 88 of the sorbent filter 18 are preferably produced from materials sorbing iodine and organoiodine, for example from binder-free zeolites with an open structure, that is to say an open-pore system, and with silver doping that is non-soluble in wet operation. If the occurrence of moisture in the sorbent filter 18 can be reliably ruled out in all operating states of the depressurization system 8, for instance by correspondingly designing the superheating capacity in the superheating section 80, zeolites with a silver-nitrate doping or coating, the retaining effect of which for organoiodine has surprisingly been found to be particularly high with a sufficiently high dew-point difference of the depressurization flow, may alternatively also be provided as filter materials, or at least admixed.

For reliable control over particular operating states, for instance during start-up operation, an additional heating device 136, which is operated with an external energy source (for example electrically), is optionally thermally coupled to the depressurization line 12. Here in FIG. 2, it is arranged for example in/on the central chamber 84 of the heat-exchanger/sorbent-filter unit 82, alternatively or in addition in the filter chamber 16, in particular in the inflow space 90 thereof. It goes without saying that other mounting locations are also conceivable.

Furthermore, devices for vacuum restriction 138 may be provided for example in the line section 38 between the outlet 10 from the containment shell 4 and the washing tank 14. This is used to avoid or quantitatively restrict the formation of a vacuum in the containment shell 4, for example after venting and subsequent partial condensation of the vapor that is present (for example by activating a spray system or other cooling system) by way of air-intake suction into the containment shell 4 as and when required.

For an active extraction of the gas-vapor mixture located in the containment shell 4, a suction blower 140, which is supplied with driving energy by way of an external energy source, may be optionally connected into the depressurization line 12, for example upstream of the washing tank 14, but preferably downstream of the sorbent filter 18, or able to be activated if need be. The suction blower 140 is advantageously designed such that, in combination with a low water coverage of the inflow nozzles 42 and comparatively low nozzle speeds (<50 m/s), here only a coarse aerosol precleaning takes place, but it is subsequently possible for optimum speeds to be set in the downstream filter devices, with less than ¼ of the maximum throughput. It is thereby possible to bring the interior space 6 of the containment shell to a (slight) subatmospheric pressure with respect to the ambient atmosphere, and keep it at this subatmospheric pressure, and consequently to avoid external leakages completely.

In the case of an alternative configurational variant that is likewise represented in FIG. 1, there is no need for the washing tank 14 (set up outside the containment shell 4) in the case of a boiling-water reactor. Instead, a wet filtering of the depressurization flow leaving the containment shell 4 takes place while it is still inside the containment shell 4, in a condensation chamber 152 located there. The condensation chamber 152 is separated from the remaining interior space 6 in the containment shell 4 by way of a gas-tight and pressure-stable separating wall 154. A connection in terms of flow between the two spatial regions is realized only by way of one or more overflow pipes 156, which are immersed in the condensate liquid 158 that is present in the condensation chamber 152. That is to say that the outflow opening 160 of the respective overflow pipe 156 is located below the minimum filling level 162 of condensate liquid 158. The depressurization line 12' (drawn here with dashed lines) is in this case connected to a condensation chamber outlet 164, which is arranged above the maximum filling level in the gas-collecting space 170 lying above the condensate liquid 158. In the example shown here, the condensation chamber outlet 164 coincides with the outlet 10' from the containment shell 4. The depressurization line 12' is led from the outlet 10' directly to the heat-exchanger/sorbent-filter unit 82 without a scrubber being interposed.

Figure 3:
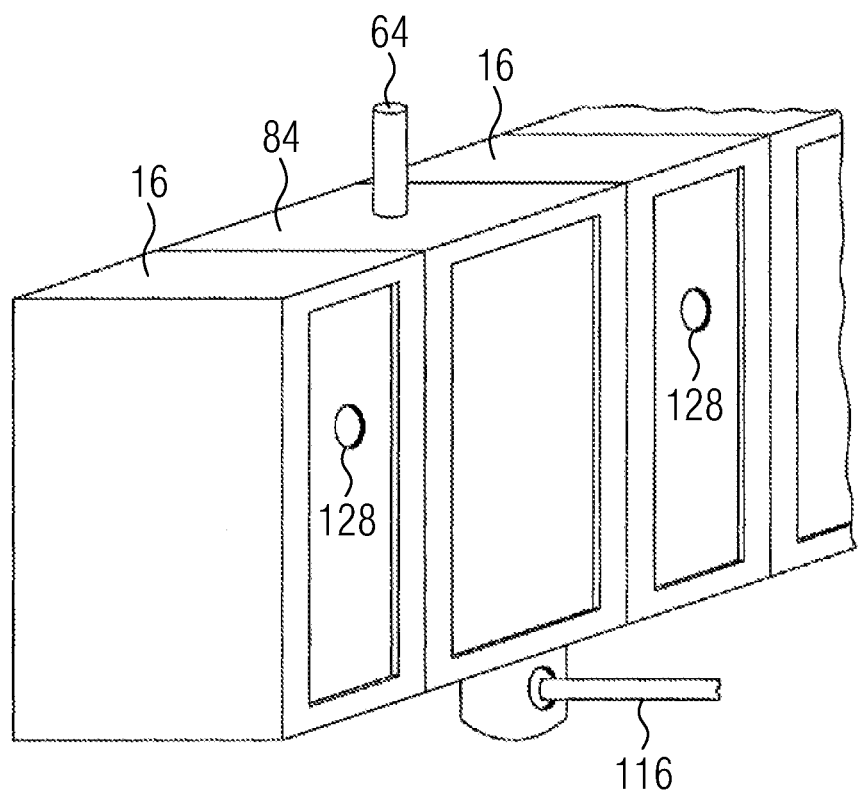
FIG. 3 is a diagrammatic, perspective view of a number of regenerative heat-exchanger and sorbent-filter units according to FIG. 2 set up next to one another.

Finally, it should be mentioned that the depressurization system 8 may have a number of strands of the same or similar type of construction that are connected in parallel in terms of flow. It is also possible for only individual sections of the depressurization line 12 to be duplicated by connecting identical components in parallel. It may be advisable in this case to set up a number of the heat-exchanger/sorbent-filter units 82 that are represented in FIG. 2 in the manner of a modular system directly adjoining one another and thermally coupled to one another, to be precise preferably with an alternating arrangement of for example box-shaped central chambers 84 and corresponding filter chambers 16. This is illustrated in FIG. 3.

Figure 4:
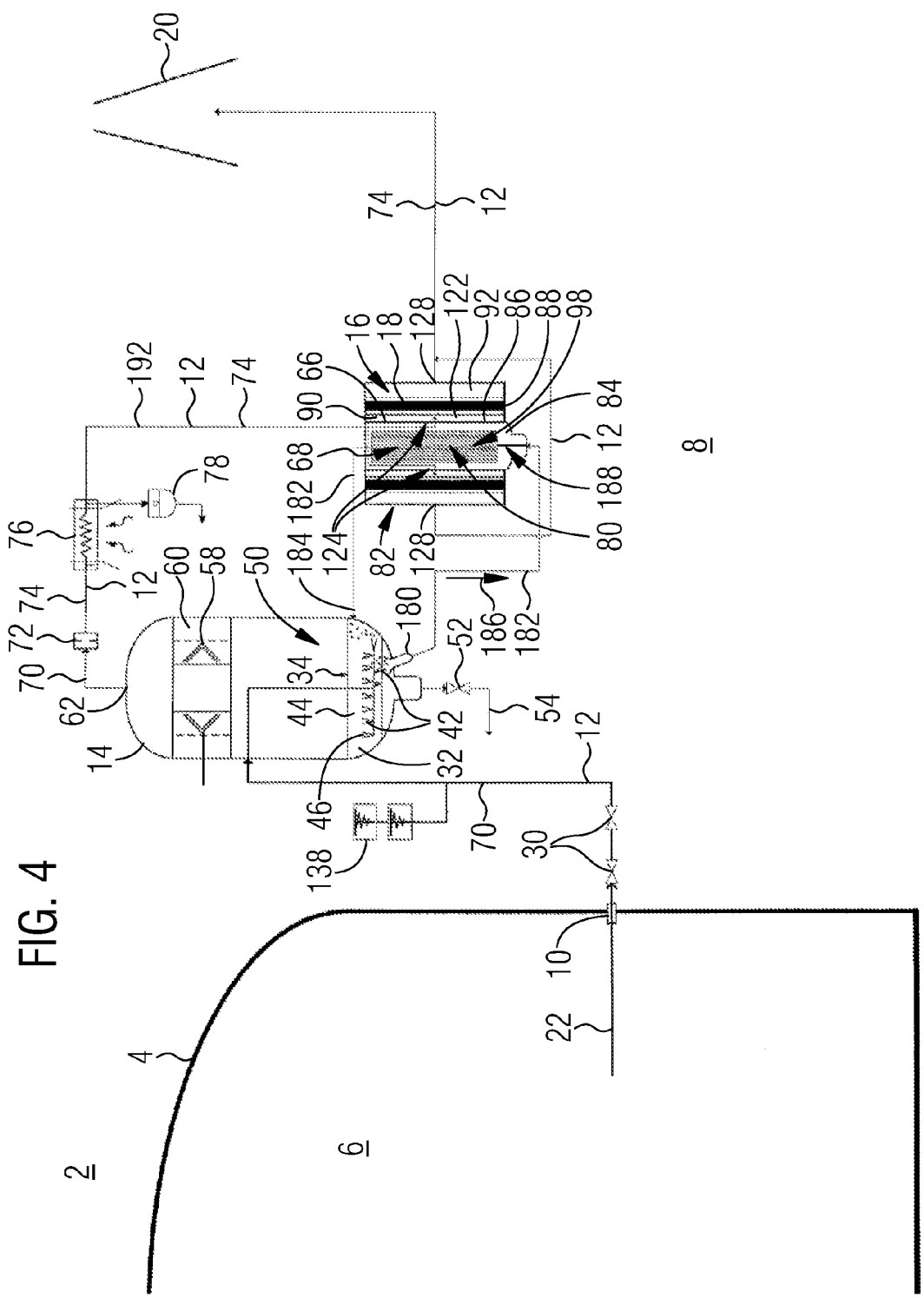
FIG. 4 is an illustration of an alternative variant of the depressurization system according to FIG. 1.

Also in the case of the variant of the depressurization system 8 that is represented in FIG. 4, the depressurization flow coming from the containment shell 4 is initially cleaned in a washing tank 14, depressurized further downstream at a throttle 72, possibly dried in a gas dryer 76, then conducted through a superheating section 80, in which a regenerative heating takes place, and finally conducted through the filter chamber 16 with the sorbent filter 18, before it is blown out into the surroundings via the flue 20. As in the case of the variants described above, a comparatively high dew-point difference of at least 10° C., preferably at least 20° C., is ensured in full-load operation by the superheating of the depressurization flow immediately before it enters the filter chamber, in order to prevent condensing out in the region of the sorbent filter 18, and in order to achieve particularly effective retention of iodine-containing activity carriers.

As a difference from the variants described above, in the case of the system according to FIG. 4 the thermal energy required for the superheating of the low-pressure depressurization flow and for the heating of the filter chamber 16 is not transferred directly from the high-pressure depressurization flow. Rather, here the washing liquid 32 that is kept in the washing tank 14, and is for its part heated by the inflowing high-pressure depressurization flow, is used as a heat-transporting and heating medium.

For this purpose, the inlet end 118 of a circulation line 182 is connected to the washing tank 14 in the lower region of the washing liquid pool 44, that is to say for example well below the minimum filling level 34. The outlet end 184 of the circulation line 182 is connected to the washing tank 14 at a geodetically higher point than the inlet end 180, for instance as represented here just below the minimum filling level 34 or else somewhat higher in the discharge zone 50. During venting operation—driven by the flow impulse of the venting gas flow flowing into the washing tank 14 through the inflow nozzles 42—the circulation line 182 is flowed through in the direction of flow 186 by a (bubble-containing) washing-liquid/venting-gas mixture. The washing liquid 32 mixed with the venting gas is consequently removed from the washing tank 14 at a comparatively low point and—after an interposed rising section 188—is circulated back into it again at a higher point in the manner of a washing liquid circuit. For particularly good utilization of the driving pulse, at least one of the inflow nozzles 42 is in this case aligned with the inlet end 180 of the circulation line 182, that is to say is directed (obliquely) downward here. The circulation is in this case assisted in accordance with the principle of natural circulation by the differences in density between the (clean) washing liquid 32 and the (bubble-containing) washing-liquid/venting-gas mixture.

In the rising section 188 of the circulation line 182, the circulating washing liquid 32, mixed with venting gas, is conducted from bottom to top through a number of heat-exchanger tubes 98 connected in parallel in terms of flow (or else other heat-exchanger elements), which are arranged in approximately vertical alignment within the central chamber 84 of the heat-exchanger/sorbent-filter unit 82. The depressurization flow in the line section 192 of the depressurization line 12, coming from the washing tank 14 via the throttle 72 and the gas dryer 76 and cleaned in the wet filtering, is in turn conducted through the central chamber 84 in counterflow with respect to the washing liquid 32 circulating through the heat-exchanger tubes 98, i.e. from top to bottom, externally past the heat-exchanger elements 98. The depressurization flow flows through the central chamber 84 before it passes over into the filter chamber 16 with the sorbent filter 18 by way of through-openings 122 arranged in a lower region in the separating wall 86 between the central chamber 84 and the filter chamber 16 and forming the filter chamber inlet 124 (the filter chamber inlet 124 will generally be further down, in the region of the bottom of the separating wall 86, than how it is represented here in the purely schematic FIG. 4).

By analogy with the variant described in conjunction with FIG. 1 and FIG. 2, the tube walls of the heat-exchanger tubes 98 and the separating wall 86 consequently form heat-exchanger surfaces 66 and 68 for a heat transfer from the circulating washing liquid 32 to the low-pressure depressurization flow on the one hand and the filter chamber 16 on the other hand. The section of the central chamber 84 that is flowed through by the low-pressure depressurization flow thereby forms the superheating section 80, which in terms of flow is connected directly upstream of the filter chamber 16.

Figure 5:
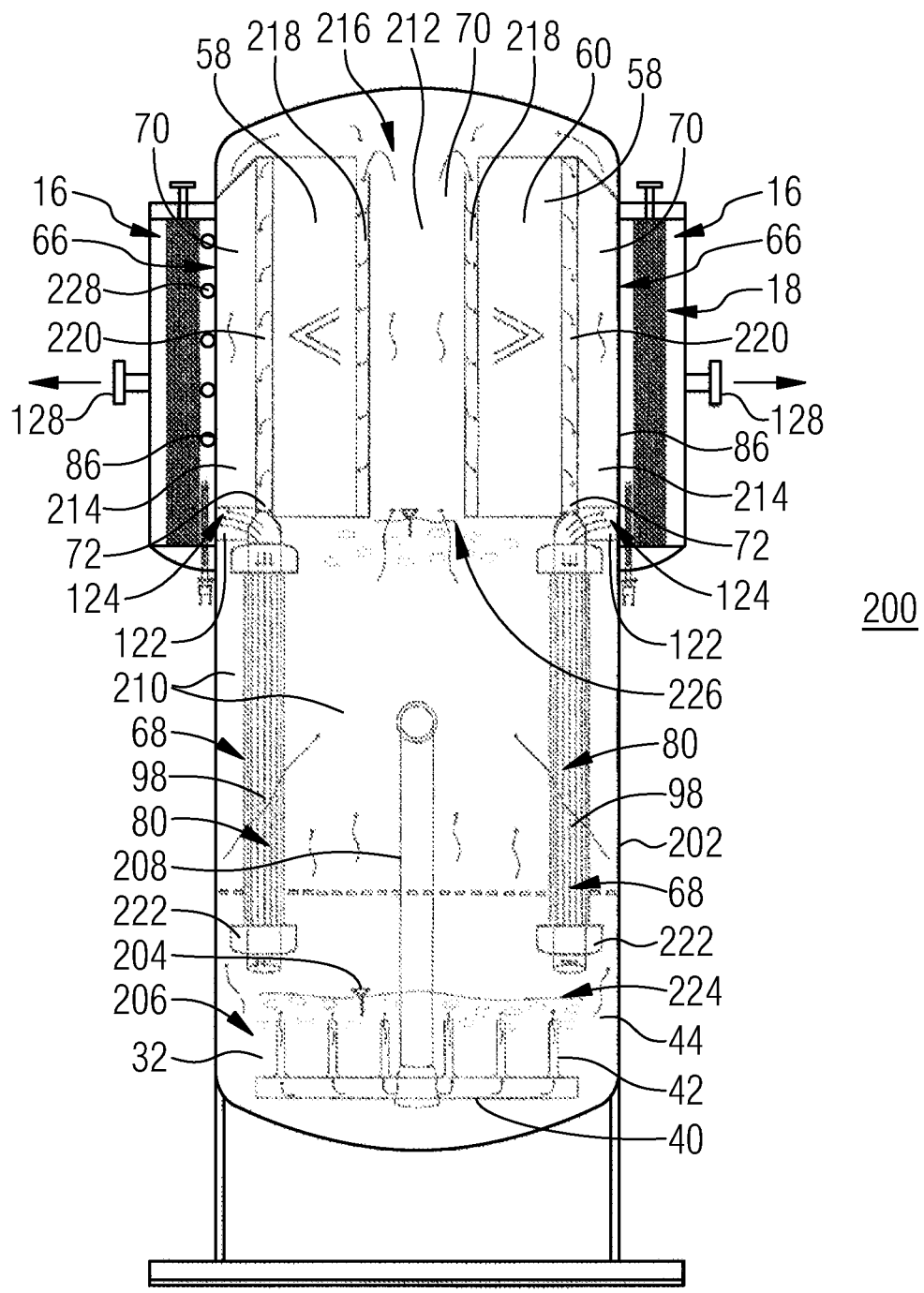
FIG. 5 is an illustration of an alternative variant of the combined regenerative heat-exchanger and sorbent-filter unit according to FIG. 2 with an integrated washing tank.

Finally, a further variant of the depressurization system 8 is represented in the form of a detail in FIG. 5. It contains a combined scrubber/heat-exchanger/sorbent-filter unit 200. Conceptually, it can be imagined that, for this purpose, the washing tank 14 and the heat-exchanger/sorbent-filter unit 82 of the depressurization system 8 according to FIG. 1 are arranged and integrated in a common housing 202.

In actual fact, the scrubber/heat-exchanger/sorbent-filter unit 200 represented in longitudinal section in FIG. 5 contains a washing region 206, which is arranged in the lower section of the housing 202 and is filled with washing liquid 32, at least up to a minimum filling level 204. A depressurization flow taken from the containment shell of a nuclear power plant is conducted to a plurality of inflow nozzles 42 connected in parallel in terms of flow, via a pipeline 208, which is led through a housing aperture, and a manifold 40 adjoining in terms of flow. When it leaves into the washing liquid pool 44, the venting gas flow is subjected to a wet filtering, entirely analogous to the washing tank 14 known from FIG. 1.

Following separation of the washing-liquid/venting-gas mixture, the venting gas flow, cleaned and freed of coarse aerosols and under high pressure, flows through the central space 210 and further upwardly adjoining flow channels or corridors 212 and 214, which are partly taken past the outer annular filter chamber 16 and are in thermal contact with it, up to the cover region 216 of the housing 202, is deflected there and enters moisture separators 58 and filter elements 60 via flow channels 218. For more intensive preheating, a partial flow of the high-pressure depressurization flow may be removed via an additional heating device 228 and, while bypassing the downstream heat-exchanger tubes 98 (see below), conducted directly through the sorbent filter 18 or the upstream region. On the downstream side of the respective filter element 60, the depressurization flow is fed via a flow channel 220 in the downward direction to a throttle 72 and depressurized there. In the adjoining low-pressure section, the depressurized venting gas flows initially further down through a plurality of heat-exchanger tubes 98 connected in parallel in terms of flow, is forced into a reversal of direction in the reversing sections 222, by a suitable contouring of the flow-conducting elements, and flows through adjoining heat-exchanger tubes 98, lying in series in terms of flow and geometrically parallel to the downwardly leading heat-exchanger tubes 98, back up to the through-openings 128 into the filter chamber 16, forming the filter chamber inlet 124. The filter chamber is constructed in a way analogous to the filter chamber 16 in the case of the device according to FIG. 1 or FIG. 2. The depressurization flow filtered in the sorbent filter 18 leaves via the filter chamber outlet 128 into a pipeline leading to a flue (not represented here).

A heating of the filter chamber 16 takes place via the flow channels 214 for the high-pressure depressurization flow that are taken past the filter chamber 16. The heat-conducting separating walls 86 between the flow channels 214 and the filter chamber 16 thereby form heat-exchanger surfaces 66. Furthermore, the tube walls of the heat-exchanger tubes 98 form heat-exchanger surfaces 68 between the comparatively hot high-pressure depressurization flow flowing through the central space 210 and the low-pressure depressurization flow, to be superheated to a dew-point difference of at least 10° C., preferably more than 20° C., before it enters the filter chamber 16, in the heat-exchanger tubes 98. The heat-exchanger tubes 98 consequently represent the superheating section 80 for the depressurization flow previously depressurized at the throttle 72.

In the case of the operating state represented in FIG. 5, the liquid level 224 of the washing liquid 32 lies approximately in the region of the minimum filling level 204, and consequently below the reversing sections 222 and the heat-exchanger tubes 98 lying above them. The heat-exchanger tubes 98 are therefore exclusively, or at least predominantly, "dry"-heated by the high-pressure depressurization flow conducted externally past them that has previously been cleaned in the washing liquid pool 44. With a greater filling level, and consequently a liquid level 224 that is further up in the region of the heat-exchanger tubes 98, on the other hand, a partial or even complete "wet" heating of the heat-exchanger tubes 98 is also possible by way of the washing liquid 32, which for its part is heated by the venting gas flowing in via the inflow nozzles 42. The admissible maximum filling level 226 lies just below the moisture separators 58 or filters 60.

LIST OF DESIGNATIONS

2 Nuclear power plant
4 Containment shell
6 Interior space
8 Depressurization system
10, 10' Outlet
12, 12' Depressurization line
14 Washing tank
16 Filter chamber
18 Sorbent filter
20 Flue
22 Line section
24 Prefilter
26 Bypass line
28 Control valve
30 Shut-off valve
32 Washing liquid
34 Minimum filling level
36 Metering device
38 Line section
40 Manifold
42 Inflow nozzle
44 Washing liquid pool
46 Venturi tube
48 Outlet opening
50 Discharge zone 52 Shut-off valve
54 Liquid-discharge line
56 Maximum filling level
58 Moisture separator
60 Filter element
62 Outlet opening
64 Line section
66 Heat-exchanger surface
68 Heat-exchanger surface
70 High-pressure section
72 Throttle
74 Low-pressure section
76 Gas dryer
78 Condensate-collecting tank
80 Superheating section
82 Heat-exchanger/sorbent-filter unit
84 Central chamber
86 Separating wall
88 Filter element
90 Inflow space
92 Outflow space
94 Interior space
96 Fins
98 Heat-exchanger tube
100 Cover housing
102 Housing aperture
104 Branching piece
106 Bottom region
108 Header
110 Housing aperture
112 Central chamber housing
114 Pipeline
116 Line section
118 Line section
120 Central chamber inlet
122 Through-opening
124 Filter chamber inlet
126 Filter chamber housing
128 Filter chamber outlet
130 Line section
132 Condensate
134 Condensate-discharge line
136 Additional heating device
138 Vacuum restriction
140 Suction blower
142 Branching point
144 Bypass line
148 Opening point
150 Pressure-reducing valve
152 Condensation chamber
154 Separating wall
156 Overflow pipe
158 Condensate liquid
160 Outflow opening
162 Minimum filling level
164 Condensation chamber outlet
170 Gas-collecting space
180 Inlet end
182 Circulation line
184 Outlet end
186 Direction of flow
188 Rising section
192 Line section
200 Scrubber/heat-exchanger/sorbent-filter unit
202 Housing
204 Minimum filling level
206 Washing region
208 Pipeline
210 Central space
212 Flow channel
214 Flow channel
216 Cover region
218 Flow channel
220 Flow channel
222 Reversing section
224 Liquid level
226 Maximum filling level
228 Heating device\

The invention claimed is:

1. A method for depressurizing a nuclear power plant including a containment shell for containing activity carriers and having an outlet for a depressurization flow, the depressurization flow conducted out of the containment shell into the atmosphere via a depressurization line being provided with a filter system, the filter system containing a filter chamber having a filter chamber inlet, a filter chamber outlet and a sorbent filter lying there-between, which comprises the steps of:
first conducting the depressurization flow in a high-pressure section of the depressurization line;
depressurizing the depressurization flow by means of expansion at a throttle device;
immediately before the depressurization flow enters the filter chamber, conducting the depressurization flow that has been depressurized by the throttle device through a superheating section, in which the depressurization flow is heated by direct or indirect heat transfer from a not yet depressurized depressurization flow in the high-pressure section to a temperature which is at least 10° C. above a dew-point temperature present there;
conducting the depressurization flow at least partially through the filter chamber having the sorbent filter; and
blowing out the depressurization flow into the atmosphere.

2. The method according to claim 1, wherein the depressurization flow in the high-pressure section is at least partially conducted past the filter chamber and the latter is thereby heated by way of heat transfer.

3. The method according to claim 1, which further comprises providing a central chamber which surrounds or adjoins the filter chamber, and conducting the depressurization flow in the high-pressure section through heat-exchanger elements arranged in the central chamber or protruding into said central chamber, and the depressurization flow in the superheating section being conducted through the central chamber externally past the heat-exchanger elements.

4. The method according to claim 3, which further comprises conducting the depressurization flow in the superheating section in counterflow or cross-counterflow with respect to the depressurization flow in the high-pressure section.

5. The method according to claim 1, which further comprises conducting the depressurization flow in the high-pressure section through a washing tank containing a washing liquid and having a number of inflow nozzles.

6. The method according to claim 5, wherein the depressurization flow flows through the inflow nozzles at a flow rate of over 100 m/s.

7. The method according to claim 5, which further comprises forming the inflow nozzles as venturi scrubber type nozzles.

8. The method according to claim 1, which further comprises removing the depressurization flow from a condensation chamber of a nuclear reactor and conducted from there past the filter chamber to heat it, without a washing tank being interposed.

9. The method according to claim 5, which further comprises conducting the washing liquid out from the washing tank through a circulation line, at least a portion of which is in thermal contact with the filter chamber and heats the latter by heat transfer from the circulating washing liquid.

10. The method according to claim 9, wherein the depressurization flow depressurized by the throttle device in the superheating section is in thermal contact with the circulation line and is heated by heat transfer from the washing liquid.

11. The method according to claim 9, wherein a flow of the washing liquid through the circulation line is driven by a momentum transferred in the washing tank from the depressurization flow to the washing liquid.

12. The method according to claim 9, wherein, after flowing through the circulation line, the washing liquid removed from the washing tank is returned to the washing tank at a geodetically higher point.

13. The method according to claim 9, wherein a central chamber which surrounds or adjoins the filter chamber is provided, the washing liquid being conducted through heat-exchanger elements disposed in the central chamber or protruding into it, namely heat-exchanger tubes, and the depressurization flow in the superheating section being conducted through the central chamber externally past the heat-exchanger elements.

14. The method according to claim 13, wherein the depressurization flow flows through the central chamber with a vertical main direction of flow from top to bottom and the washing liquid flows through the heat-exchanger elements with the vertical main direction of flow from bottom to top.

15. The method according to claim 9, which further comprises setting a flow rate of the washing liquid in the circulation line to be over 1 m/s.

16. The method according to claim 15, which further comprises setting the flow rate of the washing liquid in the circulation line to be over 3 m/s.

17. The method according to claim 8, wherein the nuclear reactor is a boiling-water reactor.

18. The method according to claim 1, which further comprises blowing out a partial flow of the depressurization flow directly into the atmosphere via a bypass line while bypassing the filter chamber.

19. The method according to claim 1, which further comprises setting a flow rate of the depressurization flow in a range from 10 m/s to 50 m/s in full-load operation in the high-pressure section.

20. The method according to claim 1, which further comprises setting a flow rate of the depressurization flow in a range from 10 m/s to 70 m/s in full load operation in the superheating section.

21. The method according to claim 1, which further comprises setting a free flow cross section of the throttle device in such a way that pressure in the high-pressure section is two to five times a pressure in the superheating section.

22. The method according to claim 1, which further comprises conducting the depressurization flow via the sorbent filter with a non-water-soluble and high-temperature-resistant silver doping.

23. The method according to claim 1, which further comprises heating the not yet depressurized depressurization flow in the high-pressure section to a temperature which is 20° C. to 50° C. above a dew-point temperature present there.

24. A depressurization system for a nuclear power plant having a containment shell for containing activity carriers and having an outlet for a depressurization flow, the depressurization system comprising:

a depressurization line connected to the outlet and having a high-pressure section;

a filter system connected in said depressurization line, said filter system containing a filter chamber having a filter chamber inlet, a filter chamber outlet and a sorbent filter lying there-between;

a throttle device connected into said depressurization line at an end of said high-pressure section, said depressurization line opening out downstream of said throttle device into said filter chamber inlet;

a blow-out unit having a blow-out opening formed therein and leading to atmosphere, said filter chamber outlet connected to said blow-out opening leading into the atmosphere; and said depressurization line having a superheating section disposed between said throttle device and said filter chamber inlet, said superheating section having heat-exchanger surfaces and being thermally coupled to said high-pressure section via said heat-exchanger surfaces, said heat-exchanger surfaces being dimensioned such that the depressurization flow established under design-basis accident conditions in said superheating section is heated to a temperature which is at least 10° C. above a dew-point temperature present there.

25. The depressurization system according to claim 24, wherein at least a portion of said high-pressure section is taken past said filter chamber and is thermally coupled to said filter chamber via said heat-exchanger surfaces, with the result that said filter chamber is heated by the depressurization flow.

26. The depressurization system according to claim 24, further comprising:

a central chamber, said filter chamber surrounding or adjoining said central chamber;

at least one heat-exchanger element through which a flow can pass disposed in said central chamber or said at least one heat-exchanger element protruding into said central chamber, and a conduction of the depressurization flow in said depressurization line being configured such that the depressurization flow in said high-pressure section is conducted through said heat-exchanger element and in said superheating section is conducted through said central chamber externally past said heat-exchanger element.

27. The depressurization system according to claim 26, wherein said heat-exchanger element is aligned in relation to said central chamber such that the depressurization flow in said superheating section is conducted in counterflow or cross-counterflow with respect to the depressurization flow in said high-pressure section.

28. The depressurization system according to claim 24, further comprising a washing tank containing a washing liquid and having at least one inflow nozzle, said washing tank is connected into said depressurization line and into said high-pressure section.

29. The depressurization system according to claim 28, further comprising a circulation line for a circulation of the washing liquid and connected to said washing tank, said circulation line being taken past said filter chamber and being in thermal contact with said filter chamber, with a result that a heat transfer takes place from a circulating washing liquid to said filter chamber.

30. The depressurization system according to claim 29, wherein said superheating section of said depressurization line is thermally coupled to said circulation line via said heat-exchanger surfaces, with a result that a heat transfer takes place there from the circulating washing liquid to the depressurization flow.

31. The depressurization system according to claim 29, further comprising a central chamber, said filter chamber surrounding or adjoining said central chamber, said circulation line having at least one heat-exchanger element, which is disposed in said central chamber or protruding into said central chamber and is flowed through by the washing liquid during depressurizing operation, and a conduction of the depressurization flow in said depressurization line being configured such that the depressurization flow in said superheating section is conducted through said central chamber externally past said at least one heat-exchanger element.

32. The depressurization system according to claim 31, wherein said at least one heat-exchanger element is aligned in relation to said central chamber such that the depressurization flow in said superheating section is conducted in counterflow or cross-counterflow with respect to the washing liquid flowing in said circulation line.

33. The depressurization system according to claim 32, wherein said central chamber and said at least one heat-exchanger element are fashioned and aligned such that the depressurization flow flows through said central chamber with a vertical main direction of flow from top to bottom, and wherein the washing liquid flows through said heat-exchanger elements with a vertical main direction of flow from bottom to top.

34. The depressurization system according to claim 29, wherein said circulation line has a washing liquid inlet, opening into said washing tank, and a washing liquid outlet, lying higher in relation to said washing liquid inlet and opening into said washing tank.

35. The depressurization system according to claim 29, wherein said at least one inflow nozzle is aligned such that a momentum of the depressurization flow flowing through said inflow nozzle is transferred to the washing liquid and drives a circulation of the washing liquid through said circulation line.

36. The depressurization system according to claim 28, wherein said at least one inflow nozzle is a venturi scrubber type nozzle.

37. The depressurization system according to claim 24, wherein the depressurization system is for a nuclear power plant having a boiling-water reactor with a condensation chamber, wherein said depressurization line is connected on an inflow side to the condensation chamber and from there is taken past said filter chamber to heat it, without a washing tank being interposed.

38. The depressurization system according to claim 24, further comprising a bypass line for bypassing said filter chamber and connected into said depressurization line.

39. The depressurization system according to claim 24, wherein said sorbent filter contains a zeolite-based sorbent material with a non-water-soluble silver doping.

40. The depressurization system according to claim 24, wherein said sorbent filter contains an inorganic sorbent material with a silver-nitrate doping.

41. The depressurization system according to claim 24, wherein said heat-exchanger surfaces being dimensioned such that the depressurization flow established under design-basis accident conditions in said superheating section is heated to a temperature which is 20° C. to 50° C. above the dew-point temperature present there.

42. A nuclear power plant, comprising:

a containment shell for containing activity carriers and having an outlet;

a depressurization system, containing:

a depressurization line connected to said outlet of said containment shell and having a high-pressure section;

a filter system connected in said depressurization line, said filter system containing a filter chamber having a filter chamber inlet, a filter chamber outlet and a sorbent filter lying there-between;

a throttle device connected into said depressurization line at an end of said high-pressure section, said depressurization line opening out downstream of said throttle device into said filter chamber inlet;

a blow-out unit having a blow-out opening formed therein and leading to atmosphere, said filter chamber outlet connected to said blow-out opening leading into the atmosphere;

said depressurization line having a superheating section disposed between said throttle device and said filter chamber inlet, said superheating section having heat-exchanger surfaces and being thermally coupled to said high-pressure section via said heat-exchanger surfaces, said heat-exchanger surfaces being dimensioned such that the depressurization flow established under design-basis accident conditions in said superheating section is heated to a temperature which is at least 10° C. above a dew-point temperature present there.

* * * * *